United States Patent [19]
Chyu

[11] 4,112,166
[45] Sep. 5, 1978

[54] METHOD OF EXTRUDING THERMOPLASTIC SHEETS

[75] Inventor: Hyun S. Chyu, Chicopee, Mass.

[73] Assignee: Monsanto Company, St. Louis, Mo.

[21] Appl. No.: 703,732

[22] Filed: Jul. 9, 1976

Related U.S. Application Data

[62] Division of Ser. No. 537,975, Jan. 2, 1975, Pat. No. 3,994,654.

[51] Int. Cl.² .............................................. B28B 21/54
[52] U.S. Cl. ............................ 428/141; 264/177 R; 428/409; 428/424; 428/437
[58] Field of Search .................. 264/177 R, DIG. 81, 264/162; 428/141, 409, 424, 377

[56] References Cited

U.S. PATENT DOCUMENTS

| T912,003 | 7/1973 | Marchant et al. | 264/51 |
|---|---|---|---|
| 1,956,564 | 5/1934 | Crane et al. | 264/177 R |
| 2,489,951 | 11/1949 | Bump | 264/177 R |
| 2,582,294 | 1/1952 | Stober | 264/141 |
| 3,056,163 | 10/1962 | Deis | 264/177 R |
| 3,512,215 | 5/1970 | Hutcheon | 264/DIG. 81 |
| 3,558,420 | 1/1971 | Opfell | 264/177 R |
| 3,605,649 | 7/1971 | Bundus | 264/177 R |
| 3,635,631 | 1/1972 | Fields | 264/DIG. 47 |
| 3,700,521 | 10/1972 | Gaffney | 264/DIG. 81 |
| 3,825,391 | 7/1974 | Davis | 264/DIG. 47 |
| 3,867,493 | 2/1975 | Seki | 264/177 R |
| 4,038,008 | 7/1977 | Larsen | 264/167 |

FOREIGN PATENT DOCUMENTS

| 43-8630 | 4/1968 | Japan | 264/177 F |
|---|---|---|---|
| 1,219,110 | 1/1971 | United Kingdom | 264/177 F |

*Primary Examiner*—Jay H. Woo
*Attorney, Agent, or Firm*—W. J. Farrington; J. C. Logomasini; S. M. Tarter

[57] ABSTRACT

The present invention relates to an improvement in a die for extruding thermoplastic sheet having a controlled degree of microsurface roughness. The improvement comprises having a beveled leading edge on at least one of the die lips wherein the bevel is away from the die orifice in order to control the degree of microsurface roughness in the extruded sheet.

12 Claims, 6 Drawing Figures

METHOD OF EXTRUDING THERMOPLASTIC SHEETS

This application was divided out from Ser. No. 537,975, filed Jan. 2, 1975, now U.S. Pat. No. 3,994,654.

BACKGROUND OF THE INVENTION

1. Field of the Invention

The present invention relates to dies for extruding thermoplastic sheet material. More particularly, the invention relates to dies wherein the leading edge of at least one die lip is beveled to a certain critical angle.

2. Description of the Prior Art

Dies for extruding molten thermoplastic material in sheet form are well known in the prior art. It is also known in the art that a controlled degree of microsurface roughness is desirable in thermoplastic sheet materials in order to minimize the tendency for the thermoplastic sheets to block, i.e., to adhere when they are in contact with each other as in rolled form or in stacks of cut sheet. US. Pat. No. 2,489,951 teaches die lips which are grooved in the direction of extrusion in order to prepare sheets having a controlled degree of microsurface roughness. While the invention is U.S. Pat. No. 2,489,951 provides a controlled degree of microsurface roughness a need exists in the art for improved apparatus and methods for imparting an even greater degree of microsurface roughness to extruded thermoplastic sheets. This is especially so in regard to the thermoplastic sheets used to prepare laminated safety glass. Improvements in the handling of plastic sheet material and the fabrication of laminated safety glass have created a need for plastic sheet material with less tendency to block to itself or to adhere prematurely to the glass during the shaping and assembly operations.

SUMMARY OF THE INVENTION

The present invention provides an improved method and apparatus for obtaining improved controlled microsurface roughness in extruded thermoplastic sheet materials. The improved degree of controlled microsurface roughness is obtained by extruding the sheet through a die orifice wherein the leading edge of at least one of the die lips is beveled to a certain critical angle away from the die orifice which beveled portion further contains grooves running in the direction of the extrusion flow of the molten polymer.

A preferred apparatus comprises in combination a die blade and a die roll which define a die orifice wherein the lip of the die blade is grooved in the direction of extrusion and wherein a compression zone is defined by the die blade and the die roll, wherein the die lip on the die blade has a beveled surface which tapers away from the die orifice.

DESCRIPTION OF THE DRAWINGS

FIG. 2 shows the upper and lower die blocks 4 and the beveled edge 2 of the die lip. The dotted line 3 represents the grooves on the die lips and dotted line A–B describes the beveled angle $\theta$. The molten thermoplastic polymer is extruded through the die orifice and the expansion of the extruded sheet within the confines of the die lips is controlled by the beveled angle $\theta$ which imparts a controlled degree of microsurface roughness to the sheet.

In FIG. 4 the die is shown in communication with the tapered outlet 7 of an extruder 6. The forward interior surfaces 8 of the extruder outlet 7 are tapered to form a compression angle $\chi$, which is defined by the dotted line C–D taken along the center line of the extruder outlet which is in communication with the die orifice. The compression angle $\chi$ may be substantially the same or less than the beveled angle $\theta$ at the leading edge of the die.

DESCRIPTION OF THE PREFERRED EMBODIMENTS

Figure 1:
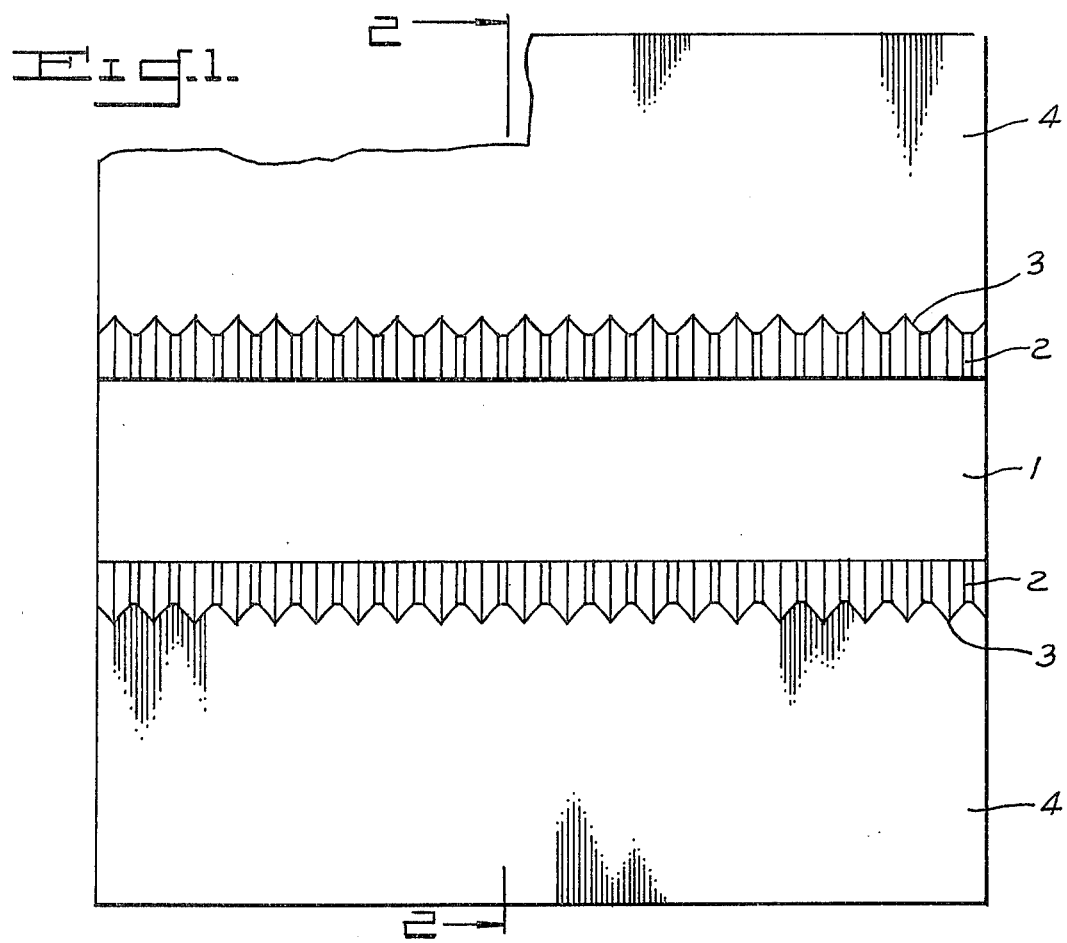
FIG. 1 is a front view of a die showing the die orifice 1 through which the molten thermoplastic polymer is extruded, the beveled edge 2 of the die lip, the grooves 3 in the beveled edge of the die lip and the die block 4.
Figure 2:
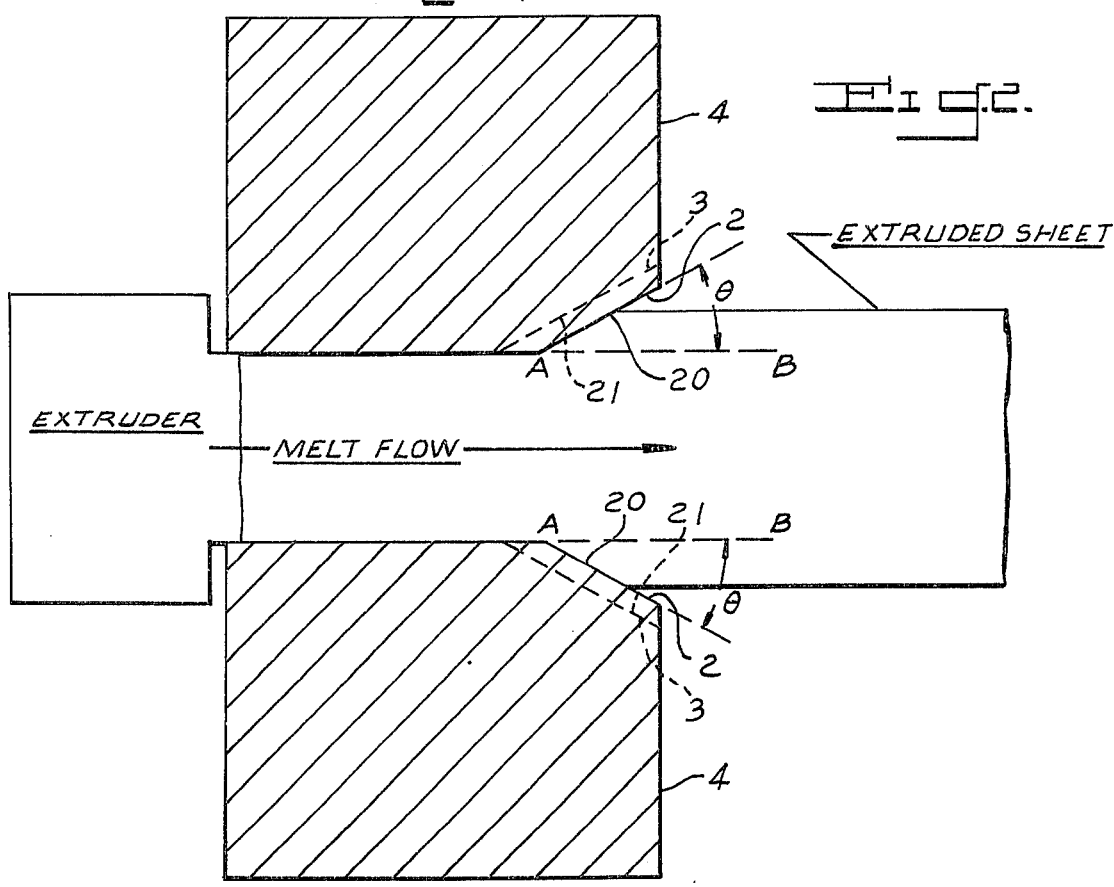
FIG. 2 is a cross sectional view of the die taken on line 2—2 of FIG. 1.
Figure 3:
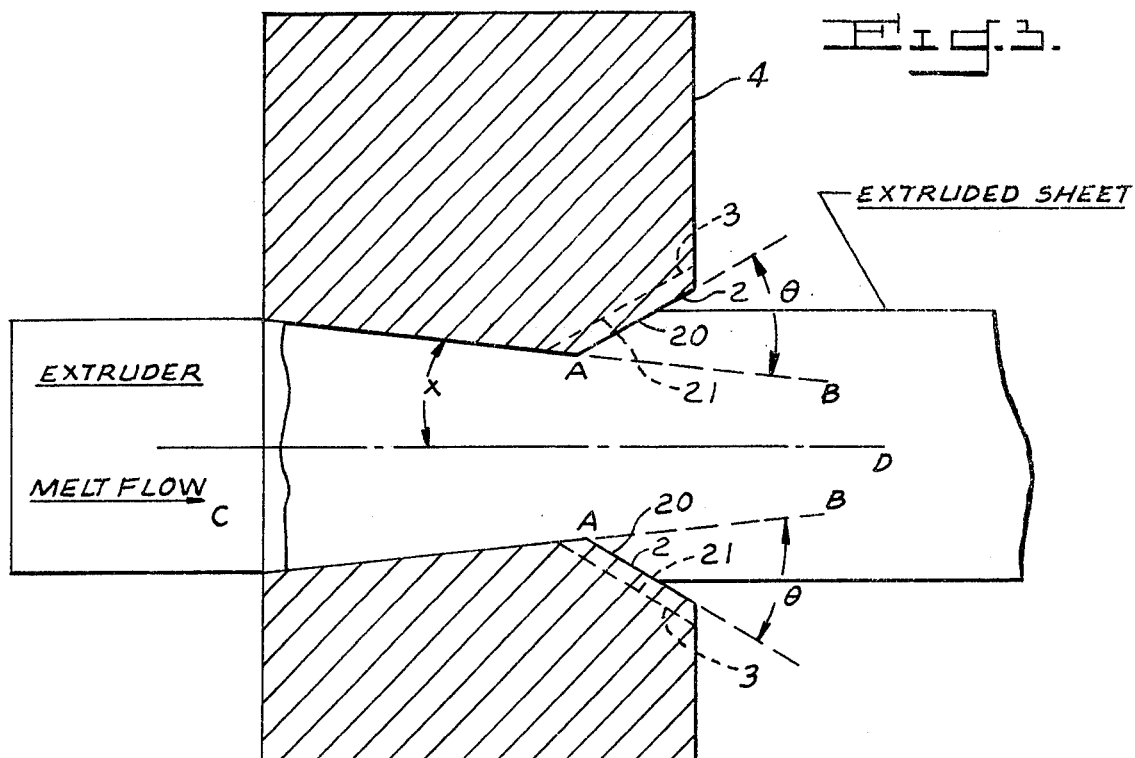
FIG. 3 is similar to FIG. 2 except that the die orifice tapers down towards the die lips. As the molten polymer moves in the direction of the extrusion flow it is compressed within the die orifice. The angle $\chi$ defined by the line C–D, which is the centerline of the die orifice, and the interior surface of the die orifice is referred to as the compression angle. The dotted line A–B defines the bevel angle $\theta$.
Figure 4:
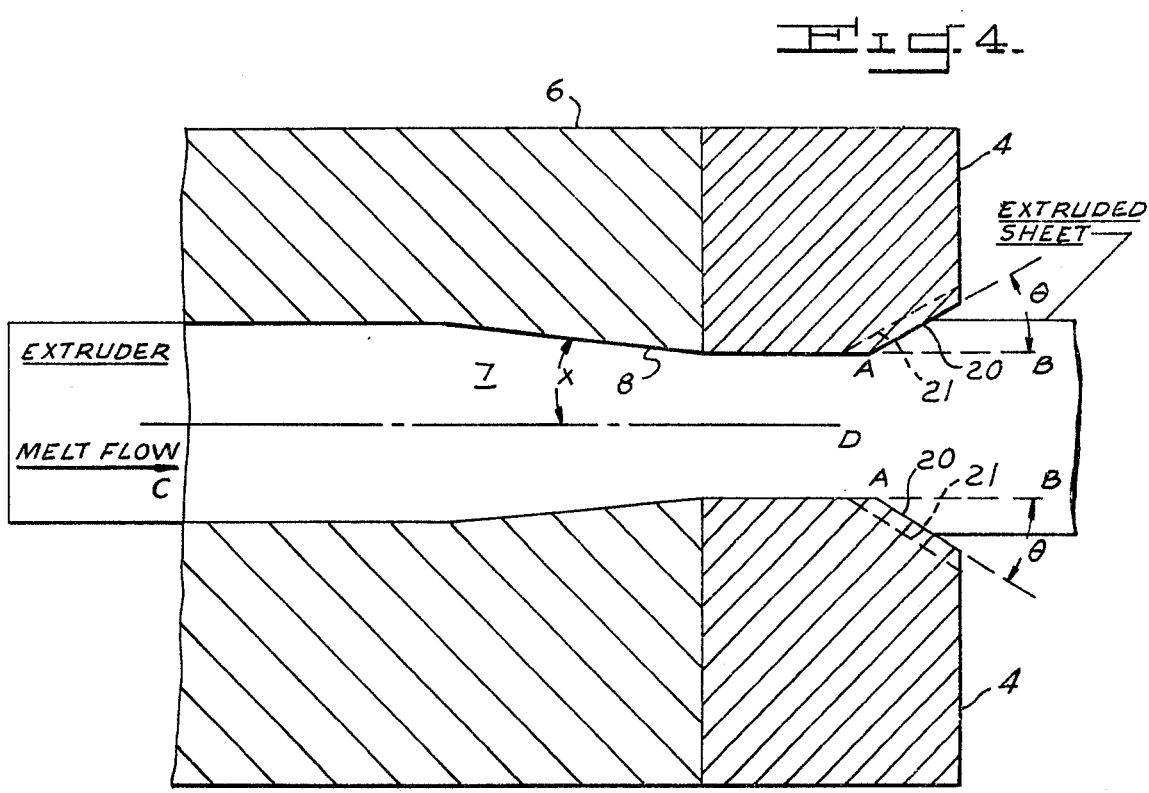
FIG. 4 is a cross sectional view of a die similar to that shown in FIG. 2.
Figure 5:
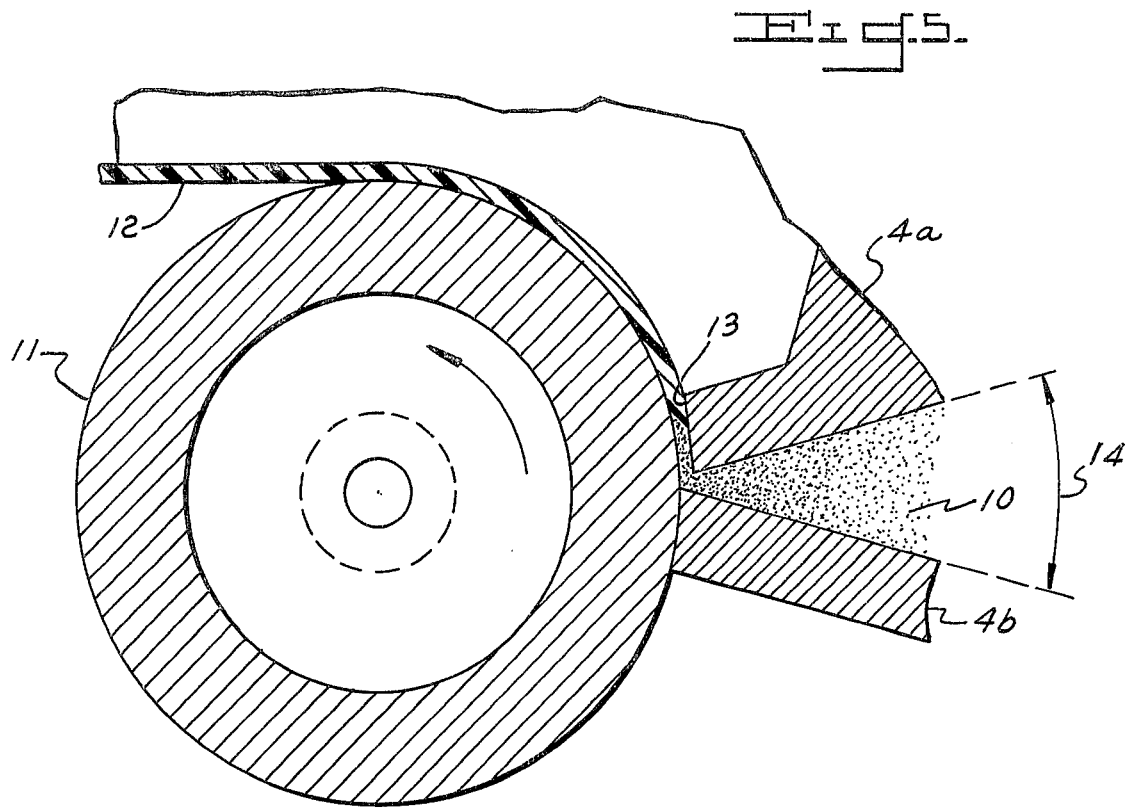
FIG. 5 is a cross sectional view of a die 4a and 4b for extruding molten polymer 10 onto a continuously moving surface 11 (a die roll) to form a polymeric sheet 12. The leading edge 13 of the die blade 4a has a beveled surface. The die blade 4a is positioned in relation to the continuously moving surface 11 to provide a compression angle between the die blade 4a and the continuously moving surface 11. The arrow indicates the direction taken by the continuously moving surface of the die roll.
Figure 6:
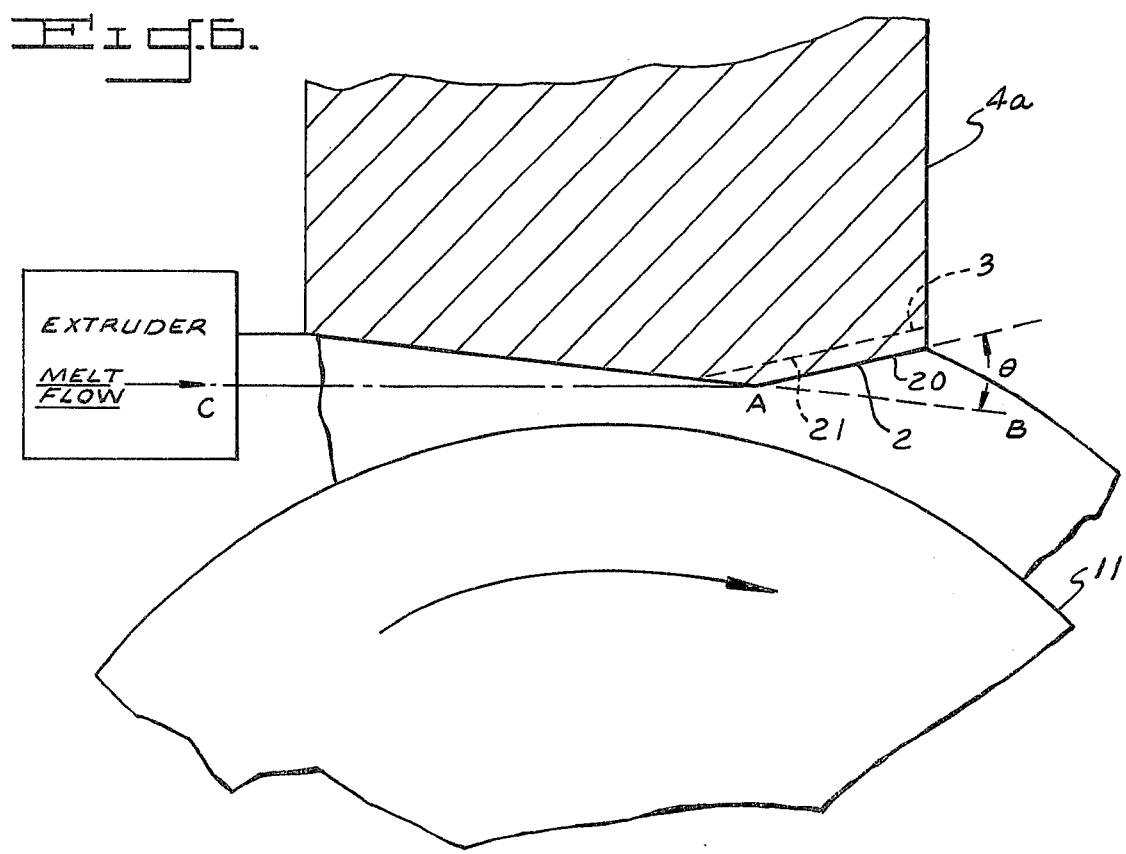
FIG. 6 is an enlarged view of an extrusion die of the type shown in FIG. 5 wherein the molten polymer is extruded onto a continuously moving surface 11 of the die roll. In this particular configuration only the leading edge of the die blade 4a is beveled to an angle $\theta$ defined by the dotted line A–B. The dotted line C–A describes the compression angle formed between the die lip 4a and the continuous moving surface 11. The grooves in the beveled angle 2 of the die lip are represented by the dotted line 3.

The beveled die lips of the present invention are preferably used in die configurations having a compression angle through which the molten polymer flows. This angle may be formed within the die orifice or extruder outlet as is shown in FIGS. 3 and 4, respectively. Alternately, the compression angle may be formed between the die and a moving surface as is shown in FIGS. 5 and 6. This compression angle may vary from 0.5° to 20° depending on the particular configuration, with an angle of from 1° to 10° being preferred from the standpoint of the melt flow of the polymer. More preferably, the compression angle is between 1° and 5°. The bevel angle on the die lip should be approximately equal to or up to 5° greater than the compression angle formed within the die orifice by the taper of the orifice toward the die lips. When extruding onto the continuous moving surface, the most preferred compression angle formed between the die lip and the moving surface is in the range of from 1° to 5° with a corresponding beveled angle which is equal to or no greater than 5° greater than the compression angle. When the bevel angle is substantially less than the compression angle there is no significant improvement in the microsurface roughness of the extruded sheet.

The length of the beveled portion of the die lip will vary with the type and size of the die. In general, the land length of the beveled portion will be in the range of from 0.1 to 5 cm. The beveled portion of the die lip should be grooved in the manner described in U.S. Pat. No. 2,489,951 which is incorporated herein by reference. However, in the present invention it is not necessary to groove the entire die lip surface. It is sufficient to groove only the beveled portion of the die lip.

The dies of the present invention may be made out of any of those suitable materials well known to those skilled in the art. The die lips are also beveled and grooved according to methods known to those skilled in the art.

The apparatus and methods of the present invention are especially useful in the preparation of extruded thermoplastic sheet material wherein it is desirable or necessary to impart a microsurface roughness to the sheet. Thermoplastic materials which may be formed into sheet using the apparatus and methods of the present invention include but are not limited to polystyrene, copolymers of styrene and at least one other monomer such as poly(styreneacrylonitrile (SAN) and poly(acrylonitrile-butadiene-styrene) (ABS), polyvinyl chloride, polyethylene, polypropylene, polyurethane, polyvinyl butyral, polycarbonate, polymethylmethacrylate, etc. The preferred materials to be used in the methods and apparatus of the present invention for the preparation of sheet material for laminated safety glass are polyvinyl butyral, polyurethane, poly(ethylene-vinyl acetate), poly(ethylene-vinyl acetatevinyl alcohol), poly(ethylene-methacrylate-acrylic acid), etc.

Surprisingly, extruded sheet formed using a die wherein at least one of the die lips has a beveled edge in accordance with the present invention has better surface characteristics as compared to sheet formed using the dies of the prior art without beveled die lips. The extruded sheets obtained according to the practice of the present invention have a greater, more uniform degree of microsurface roughness than those sheets obtained by the apparatus of the prior art.

Extruded sheet prepared according to the present invention has a generally smooth surface. However, close examination of the sheet shows a high but substantially uniform degree of microsurface roughness which results in less tendency to block and better sheet handling properties. The amount of microsurface roughness is conveniently determined by measuring the percent gloss on the sheet surface. Percent gloss correlates with the adhesion force required to separate layers of extruded viscoelastic sheet which are in contact i.e. in roll form or in stacks of cut sheet.

Percent gloss is measured with a Hunter 60° calibrated Gloss Meter manufactured by Hunter Associates Laboratories, Inc. of Fairfax, Va. The Gloss Meter indicates the percent of light reflected off the surface of the sheet. When the microsurface roughness of the sheet is greater, less light will be reflected and the gloss percent will be lower as will be the tendency of the sheet to block or to adhere prematurely to a substrate.

Gloss percent readings in excess of about 70 to 80% for plastic materials, especially the plasticized polyvinyl butyral used in laminated safety glass, indicate a low level of microsurface roughness. Such sheet has a high blocking tendency and will be difficult to handle, shape and process in the production of laminated safety glass. Conversely, gloss percent readings below 50 and preferably below 45 indicate the sheet has a greater degree of microsurface roughness. Such sheet has a lower blocking tendency and will be easier to handle, shape and process in the production of laminated safety glass.

The following examples are set forth in illustration of the present invention and are not to be construed as a limitation thereof. Unless otherwise indicated, all parts and percentages are by weight.

EXAMPLE 1

A plasticized polyvinyl butyral resin of the type conventionally used in laminated safety glass is extruded into a sheet about 0.076 cm (30 mils) thick using an apparatus of the type shown in FIGS. 5 and 6 using a die of the prior art of the type described in U.S. Pat. No. 2,489,951 having a grooved surface and forming a compression angle of about 3.5° with the moving surface. The sheet is extruded using a pressure of about 525 psi, a stock temperature of 213° C. (415° F.) and a die temperature 113° C. (235° F.). The extruded sheet has a gloss percent of about 50 indicating a moderate degree of microsurface roughness.

EXAMPLE 2

This example illustrates the methods and apparatus of the present invention, wherein a beveled die lip is used to get a better degree of microsurface roughness. The apparatus and procedures of Example 1 are used here except that the leading edge of the die lip has a 4° bevel with a beveled land length of about 0.3 cm. The beveled edge is grooved in accordance with the teaching of U.S. Pat. No. 2,489,951. The gloss percent for the sheet prepared with the beveled die lip is about 35. The significant decrease in gloss level is indicative of a better degree of controlled microsurface roughness.

Visual examination of the sheets prepared in Examples 1 and 2 indicates that the sheet surfaces are essentially the same except that the sheet prepared according to Example 2 using a beveled die has less gloss indicating a greater degree of controlled microsurface roughness.

EXAMPLE 3

This example illustrates the need for using a beveled angle which is equal to or greater than the compression angle. Example 2 is repeated here except using a die lip having a beveled angle of 2°. The surface of resulting extruded sheet is evaluated and found to have a gloss percent of about 45. This is a higher level than that obtained in Example 2 when using a die lip with a 4° bevel.

What is claimed is:

1. In the method for forming thermoplastic sheet material having controlled surface roughness said method comprising extruding the thermoplastic sheet material through an extrusion apparatus comprising an extruder and a die member wherein at least one of the lips of the die member is grooved in the direction of extrusion, the improvement which comprises having a beveled surface on the grooved die lip wherein the beveled surface tapers away from the die orifice.

2. A method as in claim 1 wherein a compression zone is defined within the extrusion apparatus whereby molten thermoplastic polymer flowing through the compression zone of the extruder is compressed just prior to being discharged from the extrusion apparatus.

3. A method as in claim 2 wherein the compression zone is formed within the extruder outlet which is in communication with the die member.

4. A method as in claim 2 wherein the compression zone is formed within the die orifice.

5. A method as in claim 1 wherein the compression zone is defined by a die blade and a continuously moving surface onto which the thermoplastic sheet is extruded.

6. A method as in claim 5 wherein the compression zone is formed between the die and the continuous moving surface.

7. In the method for forming thermoplastic sheet material having controlled surface roughness said method comprising extruding the thermoplastic sheet material through the extrusion apparatus comprising in combination a die blade and a die roll which define a die orifice through which the thermoplastic sheet material is extruded wherein the lip of the die blade is grooved in the direction of extrusion and wherein a compression zone is defined by the die blade and the die roll, the improvement which comprises having a beveled surface on the grooved die lip wherein the beveled surface tapers away from the die orifice.

8. A method as in claim 7 wherein the bevel angle on the die lip is substantially the same as or greater than the compression angle formed by the die blade in the die roll.

9. A method as in claim 7 wherein the compression angle is between 1° and 10°.

10. A method as in claim 7 wherein the compression angle is between 1° and 5°.

11. A thermoplastic sheet formed by the method of claim 1.

12. A thermoplastic sheet formed by the method of claim 7.

* * * * *